United States Patent
Bååth

(10) Patent No.: US 7,733,267 B2
(45) Date of Patent: Jun. 8, 2010

(54) METHOD FOR ANALYSING A SUBSTANCE IN A CONTAINER

(75) Inventor: Lars Bååth, Eldsberga (SE)

(73) Assignee: Agellis Group AB, Lund (SE)

( * ) Notice: Subject to any disclaimer, the term of this patent is extended or adjusted under 35 U.S.C. 154(b) by 160 days.

(21) Appl. No.: 11/887,085

(22) PCT Filed: Mar. 24, 2006

(86) PCT No.: PCT/EP2006/061026
§ 371 (c)(1),
(2), (4) Date: Dec. 19, 2007

(87) PCT Pub. No.: WO2006/103201
PCT Pub. Date: Oct. 5, 2006

(65) Prior Publication Data
US 2009/0128395 A1    May 21, 2009

Related U.S. Application Data

(60) Provisional application No. 60/594,401, filed on Apr. 5, 2005.

(30) Foreign Application Priority Data
Mar. 31, 2005    (EP) .................................. 05102562

(51) Int. Cl.
*G01S 13/38* (2006.01)
*G01S 13/08* (2006.01)
*G01F 23/284* (2006.01)
*G01S 13/00* (2006.01)
*G01F 23/00* (2006.01)

(52) U.S. Cl. ...................... 342/124; 342/118; 342/175; 342/192; 342/195; 342/196; 73/290 R; 324/600; 324/629; 324/637; 324/642; 324/644

(58) Field of Classification Search .................. 331/37; 73/290 R, 304 R, 304 C, 290 B, 290 V; 324/629–648, 324/600; 342/21, 22, 82, 89, 90, 118, 120–133, 342/175, 188–197, 165–174
See application file for complete search history.

(56) References Cited

U.S. PATENT DOCUMENTS 2,912,643 A * 11/1959 Rohrbaugh et al. ......... 324/639

(Continued)

FOREIGN PATENT DOCUMENTS

RU    2152595    7/2000

OTHER PUBLICATIONS

International Search Report for PCT Application No. PCT/EP2006/061026, (Jul. 17, 2006), 3 pgs.

(Continued)

*Primary Examiner*—Bernarr E Gregory
(74) *Attorney, Agent, or Firm*—Schwegman, Lundberg & Woessner, P.A.

(57) ABSTRACT

Method and apparatus for analyzing a substance in a container, the method comprising the steps of: disposing antenna means (3) at a predetermined geometrical distance (L) from a container portion (13); transmitting a signal from said antenna means through a surface portion (12) of the substance towards said container portion; receiving a first reflected signal in said antenna means from said container portion; determining a geometrical distance (L1) from the surface portion to the container portion; varying the frequency of the transmitted signal to determine a first phase displacement between the transmitted signal and the first reflected signal; determining an optical distance from the surface portion to the container portion based on the first phase displacement; and determining the index of refraction (nt) of said substance based on the optical and geometrical from the surface portion to the container portion.

16 Claims, 2 Drawing Sheets

U.S. PATENT DOCUMENTS

| | | | | |
|---|---|---|---|---|
| 2,958,829 | A * | 11/1960 | Hay | 331/37 |
| 3,323,044 | A * | 5/1967 | Parlanti et al. | 324/636 |
| 3,356,941 | A * | 12/1967 | Everman | 324/636 |
| 3,400,330 | A * | 9/1968 | Thompson, Jr. et al. | 324/636 |
| 3,601,695 | A * | 8/1971 | Heile | 324/633 |
| 3,629,698 | A * | 12/1971 | Lamb | 324/642 |
| 3,826,978 | A * | 7/1974 | Kelly | 324/639 |
| 3,898,558 | A * | 8/1975 | Thompson, Jr. | 324/636 |
| 4,027,237 | A * | 5/1977 | Heile | 324/636 |
| 4,044,353 | A * | 8/1977 | Levy | 342/124 |
| 5,070,730 | A * | 12/1991 | Edvardsson | 73/290 V |
| 5,629,706 | A | 5/1997 | Bååth | |
| 6,198,424 | B1 | 3/2001 | Diede et al. | |
| 6,422,073 | B1 | 7/2002 | Krahbichler et al. | |
| 2003/0117150 | A1 | 6/2003 | Noik et al. | |

OTHER PUBLICATIONS

"PCT Application No. PCT/EP2006/061026 (Atty Ref P14782), International Preliminary Report on Patentability / Written Opinion mailed Oct. 11, 2007", 7 pgs.

* cited by examiner

METHOD FOR ANALYSING A SUBSTANCE IN A CONTAINER

RELATED APPLICATIONS

This application is a nationalization under 35 U.S.C. 371 of PCT/EP2006/061026, filed Mar. 24, 2006 and published as WO 2006/103201 A1 on Oct. 5, 2006, which claimed priority under 35 U.S.C. 119 to European Patent Application Serial No. 05102562.5, filed Mar. 31, 2005 and U.S. Provisional Patent Application Ser. No. 60/594,401, filed Apr. 5, 2005; which applications and publication are incorporated herein by reference and made a part hereof.

FIELD OF THE INVENTION

The present invention relates to a method for analysing a substance devised in a container by using radio waves for determination of the refraction index for the substance. In particular, the invention relates to analysing the composition of a substance or concentration of a material.

BACKGROUND

It is often of interest to analyse a substance disposed in a container in order to gain knowledge of a particular characteristic of the substance. Examples of such characteristics include material composition, and relative content of a certain material. In many situations, a contact free analysis method which does not require taking of substance samples is preferable. The reason for this may be that the substance as such is hazardous or reactive to contact detector devices, or that the substance itself may be contaminated by contact from probes or other devices. Furthermore, the characteristic sought for in the substance may vary from point to point in the bulk or along a surface of the substance, and it is therefore desirable to have an analysis method which is capable of probing larger portions of the substance in a container, for gaining knowledge of e.g. an average parameter value of a certain characteristic representative of the entire substance as a whole.

Changes in the pattern of electromagnetic wave fronts represent the most sensitive probes in physics. Electromagnetic waves may penetrate media of varying physical properties, changing its amplitude and phase in a way which is specific to the content of the media. Thus, continuum radiation will be affected when penetrating a media in the sense that the amplitude will be attenuated and the propagation velocity will change, resulting in a sudden change of phase in the interface surface. The radio band is of particular interest in that here waves can penetrate deeper into dusty areas and penetrate through materials which are opaque to visual light.

U.S. Pat. No. 5,629,706, issued to the inventor of the present invention, discloses a method for measuring the position of a metallurgical melt surface in a furnace or the like, where a metal portion of the melt is covered by a slag layer. The method includes providing a signal generator for generating signals at a plurality of frequencies over a frequency band, and providing an antenna for receiving the signals generated by the signal generator and for transmitting radio waves at the plurality of frequencies over the frequency band. The antenna is disposed adjacent the metallurgical melt, transmitting the radio waves from the antenna toward the metallurgical melt, at the plurality of frequencies over the frequency band. The transmitted radio waves are reflected in the upper surface of the slag layer and in the surface of the metal portion. The antenna thus receives reflected images of the transmitted radio waves from those surfaces, and means are provided for determining a phase displacement between the transmitted radio waves and the received reflected images of the transmitted radio waves, transforming the determined phase displacement from a frequency to a time plane, and determining from the time plane transform a position of the metal portion and the slag layer. This way, a measurement of the amount of metal present in the furnace can be obtained.

SUMMARY OF THE INVENTION

It is an object of the invention to provide an in situ method for contact free analysis of a substance disposed in a container, and in particular a method for analysing a material property of the substance.

According to the invention, this object is fulfilled by means of a method and apparatus as recited in the appended claims.

BRIEF DESCRIPTION OF THE DRAWINGS

Preferred embodiments of the invention will be described in more detail with reference to the appended drawings, on which FIG. 1 schematically illustrates a system setup for performing a method in accordance with an embodiment of the invention for analysing a substance in a container.

DETAILED DESCRIPTION OF PREFERRED EMBODIMENTS

The time-delay of a wave signal relative another wave signal is in the Fourier-, or frequency space a linear shift of phase with frequency. If a signal is transmitted towards and reflected in a surface, the relative phase of the transmitted and received signals therefore will change linearly with frequency. If the signal is measured in steps over a frequency band, then a plot of phase with frequency would be a line with a slope corresponding to the delay of the reflecting signal compared to the reference signal. The optical distance can thus be measured via such a frequency stepped system, and also the geometrical distance provided the index of refraction of the first medium is known, typically air. If the signal is instead transmitted towards a semitransparent medium, then part of the signal will be reflected, and part of the signal will propagate through the medium to be reflected in the next surface where the index of refraction again is changing. These doubly reflected waves will, when complex multiplied with the conjugate of the reference signal, i.e. the transmitted signal, show a more complicated curve of phase as a function of frequency. If data therefore are sampled as complex amplitudes in frequency channels over a frequency band, then the optical distances to both surfaces can be recovered. If then the signal is transmitted and received by an interferometer in the aperture plane, then the full three-dimensional structure of the two surfaces can be reconstructed. This is also true for a mixture where more than two surfaces are present.

The present invention is based on the inventor's realisation that the fundamental idea behind his afore-mentioned patent can be used in a different way and for different purposes. In particular, a preferred embodiment of the invention makes use of a system similar to that of U.S. Pat. No. 5,629,706. However, the system is not used for determining a position of, i.e. a geometrical distance to, a surface, but to determine the index of refraction of the substance.

Figure 3:
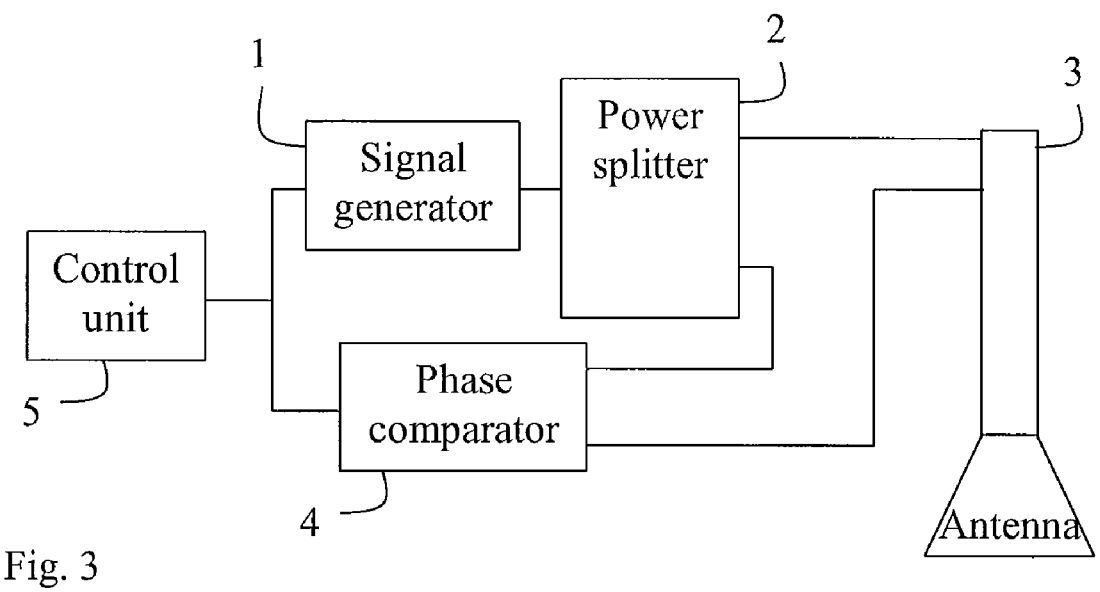

An apparatus for use in an embodiment of the invention is illustrated in FIG. 3. A signal is created at a defined frequency with a signal generator 1. This signal is transferred via a cable to a power splitter 2 where one path is conveyed via a cable to an antenna 3. The second path is conveyed via a cable to a phase comparator unit 4 where it is used as reference signal. The antenna is devised to transmit an electromagnetic signal, e.g. in the form of a circularly polarized radio wave, towards an object surface (not shown in FIG. 3). When the transmitted signal hits the object surface it is at least partly reflected, and the reflected signal is received by the same antenna 3. For a circularly polarized wave the reflected signal is received in the opposite circular polarisation due to the odd number of reflections. The received signal is transmitted through a cable to the phase comparator 4 and there complex multiplied with the conjugate of time reference signal. The phase and possibly also the amplitude of the complex conjugate multiplication is stored in a table by a control unit 5, typically a computer, and the signal generator is stepped in frequency and a new measurement is taken. This procedure continues until a certain number of frequency channels have been measured separately over a frequency band. The equipment is computer-controlled, e.g. by control unit 5, which also stores the data and performs signal analysis. Control unit 5 consequently typically includes a computer system comprising a data processor, memory means, and computer program code, which when executed by the data processor adapts the control unit to perform the steps described in this description, i.e. for example to vary the frequency of the transmitted signal in steps, to perform Fourier transform analysis of combined transmitted and received signals, and to make calculations to determine distances and indexes of refraction.

Figure 1:
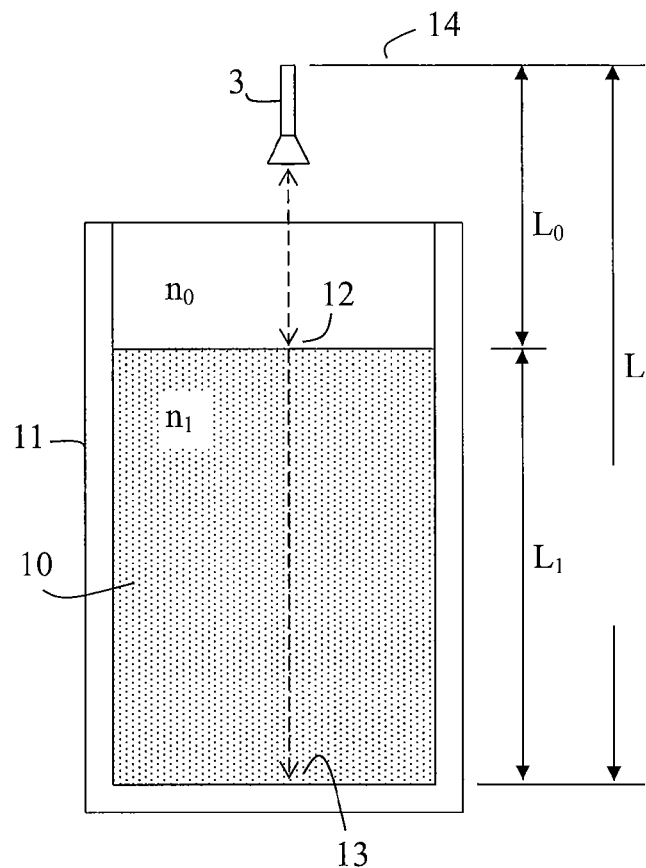

FIG. 1 shows a system setup for analysing a substance 10 in a container 11 according to an embodiment of the invention. The antenna 3 is illustrated, although the remaining parts of the apparatus of FIG. 3 are not illustrated in FIGS. 1 and 2. The object of the setup of FIG. 1 is to obtain the index of refraction $n_1$ for substance 10. For this purpose, antenna 3 is placed adjacent to an upper surface 12 of the substance, and preferably aimed perpendicularly to surface portion 12. The medium present between antenna 3 and surface portion 12 is typically air, but may be polluted or of a different gas composition, and has an index of refraction $n_0$. This index is typically very close to 1, and for the following description it is approximated that $n_0=1$. Consequently, the signal propagation speed between antenna 3 and surface portion 12 is approximated to be c, the speed of light.

When a radio signal transmitted from antenna 3 hits surface portion 12 it is partly reflected back towards antenna 3, where it is received. The received signal is transmitted through a cable to the phase comparator 4 for further processing together with the transmitted signal according to the above. In accordance with the invention, antenna 3 is placed at a predetermined geometrical distance L from, and perpendicularly aimed towards, an object fixed in relation to the container 11, wherein the line of sight from antenna 3 to the object passes through surface portion 12. This object may e.g. be a reference plate disposed in the interior of the container. In the embodiment of FIG. 1, however, the object is a bottom wall portion 13 of container 11, hereinafter denoted container portion 13. The transmitted signal will therefore partly pass through surface portion 12 and propagate through substance 10 to reflect in container portion 13 back to antenna 3.

The reference wave received at time $t_0$ and at frequency $\omega$ may be written as:

$$U_{ref}(\omega)=e^{j\omega t_0}$$

The upper surface of substance 10, of which surface portion 12 forms a part, is positioned a geometrical distance $L_0$ from antenna 3. $L_0$ may be known, but in a typical embodiment according to FIG. 1 it is not. In particular, the upper surface of substance 10 may be uneven, especially if substance 10 is a powder or particulate matter, and the actual position of surface portion 12 may therefore not be known even if a general surface position can be determined. The signal reflected from surface portion 12, being a first surface of reflection, and referred to the same receiving time $t_0$, can be written as:

$$U_{S1}(\omega)=e^{j\omega(t_0-2L_0/c)}$$

The signal propagating through substance 10 will pass twice through the substance with a geometrical distance of $L_1=L-L_0$, before and after reflecting against container portion 13. The signal received after reflection at container portion 13, being the second surface of reflection, and referred to the same receiving time $t_0$, can be written as:

$$U_{S2}(\omega)=e^{j\omega(t_0-2L_0/c-2L_1/v)}$$

Here, the propagation speed $v=c/n_1$. Distances L and L0 are measured from a reference position in the antenna represented as a level 14. The complex conjugate multiplication, where U* is the conjugate of U, or cross correlation in the time domain, of the reflected and reference signals is then:

$$S_{corr}(\omega)=U^*_{ref}(\omega)\cdot U_{S1}(\omega)+U^*_{ref}(\omega)\cdot U_{S2}(\omega)$$

or, if the frequency is restricted to a pass band $Bpass(\omega_1,\omega_h)$, where $\omega_1$ is the lowest angular frequency and $\omega_h$ is the highest angular frequency of the pass band:

$$S_{corr}(\omega)=Bpass(\omega_1,\omega_h)e^{-j\omega 2L_0/c}+Bpass(\omega_1,\omega_h)e^{-j\omega(2L_0/c+2L_1n_1/c)}$$

The inverse Fourier-transform will transform from the frequency to the time-plane (delay or distance-plane). $Bpass(\omega_1,\omega_h)$ can be approximated with $Rect(\omega_1,\omega_h)$.

$$F^{-1}S_{corr}(Dt)=sinc(Dt-2L_0/c)+sinc(Dt-2L_0/c-2L_1n_1/c)$$

The time-delay response of the system is usually called the Point Spread Function in optics, and is in this case the Fourier transform of the frequency pass band. This response is measured by studying the response of a metal reflector at a known distance. The distances to the surfaces are then reconstructed from the observed signal by deconvolving with the measured Point Spread Function. The distance can then be referred to a specified reference level, $DL_{ref}$, through a translation of the time co-ordinate: $Dt=Dt-2DL_{ref}/c$. The reference level may be a previously measured metal reflector in the signal path, the edge of the metal container, or e.g. container portion 13 when no substance is present in container 11. The transform contains the structure in the depth-direction. If the data are also sampled in the aperture plane by using an interferometer as transmitter and receiver antennas then a further two dimensional transform over the aperture-plane will show the structure over the remaining two dimensions.

According to the embodiment of FIG. 1, an antenna 3 is devised to transmit a coherent radio signal towards surface portion 12 of substance 10, and further towards container portion 13. Antenna 3 will then receive two reflected radio signals from the reflecting surfaces of surface portion 12 and container portion 13, respectively. In accordance with the above, the relative phase of the transmitted and received signals will change linearly with frequency. The frequency of the transmitted signal, and thus also the received signals, is therefore varied in steps over a frequency band and the phase displacement of the received signals compared to the transmitted signal are measured. By determining how the phase displacement varies dependent on frequency variation, the delays of the reflected signals compared to the transmitted signal are determined. In time, each frequency step should be maintained at least as long as the propagation time from transmitter to receiver, i.e. at least about twice the distance between transmitter and the farthest reflecting target as an example, transmission of a coherent wave through 1 µs produces a transmitted signal of about 300 m, which is usable for measuring at distances up to about 150 m. The transmission time may of course also be longer in each step, such as 1 ms, but shorter steps will provide a faster process.

At this point, the geometrical distance L from antenna 3 to container portion 13 is known by being predetermined, the geometrical distance $L_0$ is known by calculation from the measured time delay of the reflected signal from surface portion 12 and index of refraction $n_0$, the geometrical distance $L_1$ is known by being the difference between L and $L_0$, and the optical distance $n_1 L_1$ is known by calculation from the measured time delay of the reflected signal from container portion 13. From this information, the unknown index of refraction $n_1$ can be determined.

Figure 2:
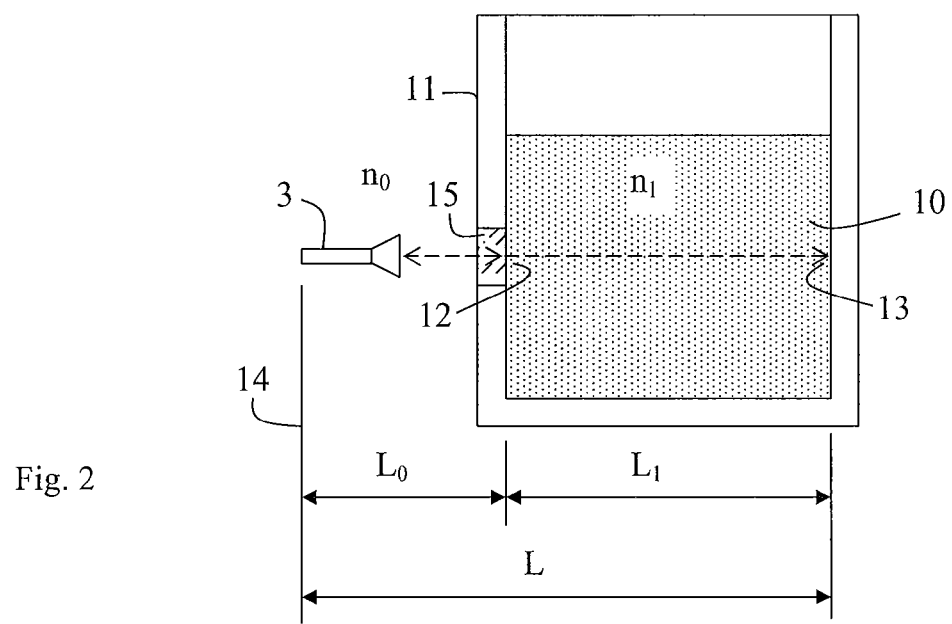
FIG. 2 schematically illustrates an alternative setup for analysing a substance in a container, and FIG. 3 schematically illustrates an embodiment of an apparatus for use in a system or method in accordance with an embodiment of the invention for analysing a substance in a container.

An alternative to the embodiment of FIG. 1 is shown in FIG. 2. In this case, antenna 3 is disposed beside container 11, aimed through a transparent portion 15 of a side wall of container 11. Transparent portion 15 is transparent to radiation in the frequency band used in the method according to the invention, but need not for that sake be visually transparent. However, the material of transparent portion 15 may e.g. be glass. The conditions of the embodiment of FIG. 2 is in most ways similar or even identical to the conditions for the embodiment of FIG. 1, and like reference numerals have therefore been used to identify like features. Apart from the transparent portion 15, the main difference distinguishing the embodiment of FIG. 2 is that the position of surface portion 12 is known, since it constitutes a first inner wall surface of container 11, in the same manner as container portion 13 constitutes a second inner wall surface of container 11. Consequently, both geometrical distances $L_0$ and $L_1$ are known beforehand. Another difference is that transparent portion 15 will give rise to two reflections in its first and second surface as well as a time delay in the total passage from antenna to portions 12 and 13 and back-However, these effects are irrelevant since they do not effect the measurable time delay between the two reflected signals, representing the optical distance $n_1 L_1$.

A setup according to FIG. 2, operated by transmitting and receiving signals in the antenna 3 which are varied in frequency in accordance with the what was described in conjunction with FIG. 1, is used according to the invention to determine the optical distance $n_1 L_1$. Since $L_1$ is already known, a measurement value of $n_1$ can thereby be calculated.

The embodiment of FIG. 1 may be preferable if substance 10 has a composition which varies in depth, and an average value is desired. If, on the other hand, it is desirable to determine the index of refraction $n_1$ at a certain depth, a method according to FIG. 2 may be more appropriate. In a variant of that embodiment, the relative position of antenna 3 and container 11 is variable, e.g. by moving either antenna 3 or container 11 up and down. In such an embodiment, it is possible to determine the index of refraction for plural layers in substance 10, by means of which a clearer picture is obtained of the internal composition structure of substance 10. A similar arrangement may of course be used in the embodiment of FIG. 1, with a sideways relative displacement of antenna 3 in relation to container 11.

The previous patent was targeted to slag thickness measurement, and required knowledge of the index of refraction of the slag material. Even though the present invention is used for a different objective and works differently, it may be realised using a similar arrangement. The example of included components given in the working example described in U.S. Pat. No. 5,629,706 is therefore incorporated herein by reference, as an example of an embodiment for carrying out the method of the present invention. Referring to that example, and FIG. 3, the two output signals from the right side of power divider 2 are connected to a first port of the antenna 3 transmitting a signal, preferably of left hand circular polarisation, with a heliax cable (Andrew FSJ4-50B), and to receiver 4 with a steel coaxial cable. The other radio frequency port on the right side of receiver 4 is connected to a second port of the antenna 3 via a heliax coaxial cable (Andrew FSJ4-50B), preferably receiving the signal in the opposite, right hand circular polarisation. A data acquisition system 5 is connected to signal generator 1 and power divider 2 via GPIB bus cables. The data acquisition system 5, preferably a Vector Network Analyser, may in this embodiment be set to step in 501 frequency steps between 10 and 15 GHz, which constitutes the frequency band of use, and the complex division of the received signal and the reference signal from the transmitter is stored for each frequency channel. A total integration time of 1 second may be used for each data sampling. The complex data is preferably stored on computer discs and each spectrum and then analyzed off line with a special computer program based on the equations given above, for determining the index of refraction $n_1$.

The working example described in U.S. Pat. No. 5,629,706 was conducted employing microwave frequencies in the 10 to 14 GHz range. This is also a usable frequency band for the present invention. However, it should be noted that the actual range of the frequency band used has to be balanced dependent on the substance 10 in question. In one aspect, the accuracy of the distance measurement increases with increasing frequency of the radio wave signal. For some substances the afore-mentioned frequency range may not work, though, since the absorption in substance 10 will be too high, e.g. if substance 10 comprises an oil. A lower frequency range will then have to be employed, e.g. in the range of 1-5 GHz, even if the accuracy of the method is thereby reduced.

As already described, the present invention is adapted for determination of an index of refraction for a substance 10. A typical application of the inventive method is where substance 10 includes a first material and a second material. If the index of refraction of for both the first material and the second material is known, the determination of the total index of refraction n, for substance 10 in accordance with the invention, may therefore be used for determining the relative amount of the second material in substance 10. A typical embodiment of such an application is where the second material is absorbed or contained in the first material. The first material may e.g. be a liquid in which the second material may is contained as an emulsion. Another embodiment, the first material is a particulate or powder material, and the second material is a liquid, which is absorbed by the first material. An example of such an embodiment is where the first material is some form of grain, and the second material is water which is absorbed in the bulk of grain. In such an embodiment, substance 10 is the water-containing grain, and container 11 may be a silo.

The invention has been described in detail by reference to preferred embodiments, but is not to be taken as limited to all of the provided details thereof, since modifications and variations thereof may be made without departing from the scope of the invention, as defined by the appended claims.

The invention claimed is:

1. Method for analysing a substance in a container, comprising:
   disposing antenna means, devised to transmit and receive radio signal waves at a plurality of frequencies over a frequency band, at a predetermined geometrical distance from a container portion;
   transmitting a signal from said antenna means through a surface portion of the substance towards said container portion;
   receiving a first reflected signal in said antenna means from said container portion;
   determining a geometrical distance from the surface portion to the container portion;
   varying the frequency of the transmitted signal to determine a first phase displacement between the transmitted signal and the first reflected signal;
   determining an optical distance from the surface portion to the container portion based on the first phase displacement; and
   determining the index of refraction of said substance based on the optical and geometrical distances from the surface portion to the container portion.

2. The method as recited in claim 1, comprising:
   receiving a second reflected signal in said antenna means from said surface portion;
   varying the frequency of the transmitted signal to determine a second phase displacement between transmitted signal and the second reflected signal;
   calculating a geometrical distance from the antenna means to the surface portion based on the second phase displacement;
   determining the geometrical distance from the surface portion to the container portion based on the predetermined geometrical distance and the calculated geometrical distance from the antenna means to the surface portion.

3. The method as recited in claim 1, wherein the antenna means are aimed to direct radio signal waves through an opening in the container.

4. The method as recited in claim 1, wherein the antenna means are aimed to direct radio signal waves through a wall portion of the container, which is transparent to said radio waves.

5. The method as recited in claim 1, wherein the antenna means are aimed to direct radio signal waves substantially vertically downwards, wherein the container portion is a inner bottom wall portion.

6. The method as recited in claim 1, wherein said substance comprises a first material having a first refraction index, and a second material having a second index of refraction, the method comprising:
   determining a relative amount of the second material in said substance, dependent on the determined index of refraction.

7. The method as recited in claim 6, wherein the second material is absorbed in the first material.

8. The method as recited in claim 7, wherein the first material is at least one of a particulate and powder material, and the second material is a liquid.

9. The method as recited in claim 1, comprising:
   multiplying the first reflected signal with the transmitted signal in the frequency domain to determine the first phase displacement;
   transforming the first phase displacement to the time domain for determining the optical distance from the surface portion to the container portion.

10. The method as recited in claim 1, comprising:
    providing signal generation means for generating signals at a plurality of frequencies over a frequency band;
    connecting the antenna means to the signal generating means for receiving said signals generated by said signal generation means and for transmitting radio waves at said plurality of frequencies over said frequency band.

11. The method as recited in claim 1, wherein said step of determining a first phase displacement between the transmitted signal and the first reflected signal comprises the step of cross correlating the transmitted signal and the received reflected signal.

12. The method as recited in claim 1, wherein said antenna means comprises an interferometer.

13. The method as recited in claim 1, wherein said step of varying the frequency of the transmitted signal comprises the step of transmitting said signal at sequential frequencies of said plurality of frequencies.

14. Apparatus for analysing a substance in a container, comprising:
    an antenna, devised to transmit and receive radio signal waves at a plurality of frequencies over a frequency band, disposed at a predetermined geometrical distance from a container portion;
    a comparator unit adapted to compare a signal transmitted through a surface portion of the substance towards said container portion, and a first reflected signal from said container portion;
    a control unit adapted to vary the frequency of the transmitted signal over a frequency band and to determine phase displacement between the transmitted signal and the first reflected signal, the control unit comprising a calculator adapted to determine an optical distance from the surface portion to the container portion based on the first phase displacement, and determine the index of refraction of said substance based on the optical and geometrical from the surface portion to the container portion.

15. The apparatus as recited in claim 14, comprising a signal generator, devised to generate an electromagnetic signal to the antenna, a signal power splitter connected between the generator and the antenna, and wherein the comparator unit is connected to the antenna and the signal power splitter.

16. The apparatus as recited in claim 14, wherein the control unit comprises means for receiving a second reflected signal in said antenna means from said surface portion;
    means for varying the frequency of the transmitted signal to determine a second phase displacement between transmitted signal and the second reflected signal;
    means for calculating a geometrical distance from the antenna means to the surface portion based on the second phase displacement; and
    means for determining the geometrical distance from the surface portion to the container portion based on the predetermined geometrical distance and the calculated geometrical distance from the antenna means to the surface portion.

* * * * *